UNITED STATES PATENT OFFICE.

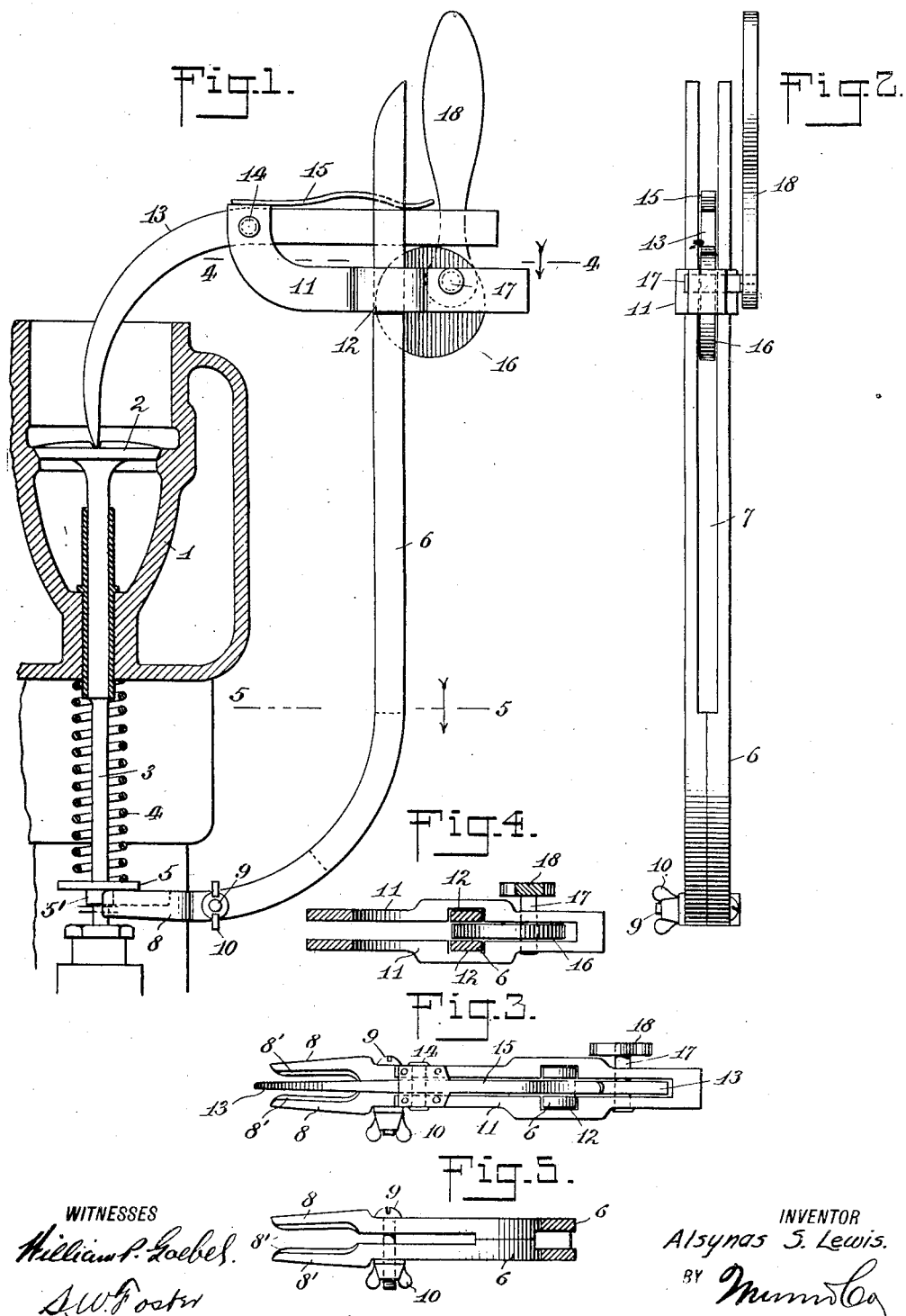

ALSYNAS S. LEWIS, OF AUBURN, WASHINGTON, ASSIGNOR OF ONE-HALF TO GEORGE H. LEWIS, OF AUBURN, WASHINGTON.

VALVE-SPRING LIFTER.

1,354,982.  Specification of Letters Patent.  Patented Oct. 5, 1920.

Application filed October 18, 1919. Serial No. 331,621.

*To all whom it may concern:*

Be it known that I, ALSYNAS S. LEWIS, a citizen of the United States, and a resident of Auburn, in the county of King and State of Washington, have invented a new and Improved Valve-Spring Lifter, of which the following is a full, clear, and exact description.

This invention relates to improvements in valve spring lifters, and more particularly to an adjustable quick acting device which exerts pressure against the valve and against the spring pressed disk so as to compress the spring and secure or hold the same in this position as long as desired.

A further object is to provide a device of the character stated, which can be adjusted to fit any size of valve stem and spring, which would be of extremely simple construction, which would be comparatively cheap to manufacture and which would be strong and durable in use.

With these and other objects in view the invention consists in certain novel features of construction, and combinations and arrangements of parts, as will be more fully hereinafter described and pointed out in the claims.

In the accompanying drawings—

Figure 1 is a view partly in section and partly in elevation illustrating my improved device in operative position;

Fig. 2 is an edge view of the device detached;

Fig. 3 is a top plan view of the device;

Fig. 4 is a view in section on the line 4—4 of Fig. 1; and

Fig. 5 is a fragmentary plan view of the forked end of the device.

1 represents a valve casing, 2 a valve having the ordinary valve stem 3 and provided with a disk or washer 5 which is pressed by means of a spring 4. My improved spring lifter comprises a bar 6 which may be of one or two parts and which is made with a relatively long longitudinal slot 7 in its upper end. The lower curved end of the bar 6 is provided with a fork 8 adapted to straddle the valve stem 3 and engage the disk or washer 5. This forked end 8 is recessed as shown at 8′ to receive the collar 5′ on the washer 5, and the space between the members of the fork can be adjusted by means of a bolt 9 and wing nut 10 so as to nicely fit any diameter of stem and collar.

A slotted arm 11 straddles the bar 6, is normally at right angles to the bar 6 and is provided in its inner faces with bearing recesses 12 to receive the sides of the bar 6. One end of this arm 11 is curved upwardly and receives therein a lever 13, the latter pivotally supported on a pin or rivet 14. One end of this lever 13 curves downwardly and is adapted to engage the valve 2, while the other end of the lever is normally horizontal and projects through the slot 7 of bar 6.

A spring 15 is secured to the end of arm 11 and projects through the slot 7 exerting a downward pressure on the lever 13 to force the same toward an eccentric 16 which is mounted to turn in the slotted arm 11 and fixed to a pin or rivet 17. A handle 18 is also fixed to the pin or rivet 17 and operates to turn the eccentric.

Fig. 1 shows the normal position of the parts. When the handle 18 is swung to the right and downwardly, the eccentric 16 is turned and engages the lever 13. As the free end of the lever 13 is stopped by means of the valve 2, the bar 6 is forced upwardly. The bearing recesses 12 are angular in cross-section and bind against the bar 6 so that the arm 11 cannot slip on the bar when the eccentric is turned. This action of the eccentric, therefore, gives the upward longitudinal movement to the bar 6 and serves to lift the washer or disk 5 and compress the spring 4. The parts will be held in this position as long as desired and because of the fact that the eccentric is pivoted to one side of the bar 6, there can be no slipping or adjusting action until the eccentric is again turned to its normal position.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A valve spring lifter, comprising a slotted bar having a forked end adapted to straddle the valve stem and engage the disk or washer thereon, an arm slidably mounted on the bar, a lever pivotally connected to the arm, and an eccentric carried by the arm and adapted to engage the lever.

2. A valve spring lifter, comprising a bar having a forked end adapted to straddle the valve stem, an arm slidably mounted on the bar, a lever pivotally connected to the arm and adapted to engage the valve, an eccentric carried by the arm and engaging the lever, a spring on the arm pressing the lever toward the eccentric, and a handle fixed to the eccentric.

3. A valve spring lifter, comprising a bar having a curved end, said curved end made in the form of a fork adapted to straddle a valve stem, an arm slidably mounted on the bar, a lever pivotally connected between its ends to the arm, and having a downwardly curved end adapted to engage a valve, and an eccentric carried by the arm and engaging the lever.

4. A valve spring lifter, comprising a slotted bar having a fork at one end adapted to straddle the valve stem, means for adjusting the members of the forked end toward each other, a slotted arm having bearing recesses in its inner faces receiving the bar, a lever pivotally supported between its ends on the arm and projecting through the slot of the bar, a pin mounted to turn in the slotted arm, an eccentric fixed to the pin and engaging the lever, a spring on the arm pressing the lever against the eccentric, and a handle secured to said pin.

ALSYNAS S. LEWIS.